US009442514B1

(12) United States Patent
Fourie (10) Patent No.: US 9,442,514 B1
(45) Date of Patent: Sep. 13, 2016

(54) GRAPHITE LAYER BETWEEN CARBON LAYERS (71) Applicant: GOOGLE INC., Mountain View, CA (US)

(72) Inventor: Daniel Fourie, San Mateo, CA (US)

(73) Assignee: GOOGLE INC., Mountain View, CA (US)

(*) Notice: Subject to any disclaimer, the term of this patent is extended or adjusted under 35 U.S.C. 154(b) by 135 days.

(21) Appl. No.: 14/338,884

(22) Filed: Jul. 23, 2014

(51) Int. Cl.
G06F 1/16 (2006.01)
G06F 1/20 (2006.01)
B32B 9/00 (2006.01)
B32B 3/26 (2006.01)
B32B 3/30 (2006.01)
B32B 7/02 (2006.01)

(52) U.S. Cl.
CPC ............ G06F 1/1613 (2013.01); B32B 3/266 (2013.01); B32B 3/30 (2013.01); B32B 7/02 (2013.01); B32B 9/007 (2013.01); G06F 1/206 (2013.01); B32B 2250/03 (2013.01); B32B 2250/04 (2013.01); B32B 2250/05 (2013.01); B32B 2260/021 (2013.01); B32B 2260/046 (2013.01); B32B 2262/106 (2013.01); B32B 2307/302 (2013.01); B32B 2307/304 (2013.01); B32B 2439/00 (2013.01); B32B 2457/20 (2013.01)

(58) Field of Classification Search
CPC ........................................................ G06F 1/16
See application file for complete search history.

(56) References Cited

U.S. PATENT DOCUMENTS 3,466,219 A 9/1969 Schwartz
3,586,102 A 6/1971 Gilles
3,741,292 A 6/1973 Aakalu et al.
4,092,697 A 5/1978 Spaight
4,155,402 A 5/1979 Just
4,262,045 A 4/1981 Cheng et al.
4,284,674 A 8/1981 Sheptak
4,563,375 A 1/1986 Ulrich
4,618,517 A 10/1986 Simko, Jr.
4,636,416 A 1/1987 Kratel et al.
4,669,632 A 6/1987 Kawasaki et al.
4,823,863 A 4/1989 Nakajima et al.
4,825,089 A 4/1989 Lindsay
4,878,152 A 10/1989 Sauzade et al.

(Continued)

FOREIGN PATENT DOCUMENTS

EP 1145074 B1 9/2002
EP 1378926 A2 1/2004

(Continued)

OTHER PUBLICATIONS

International Search Report and Written Opinion for PCT Patent Application No. PCT/US2013/065961, mailed on Feb. 14, 2014, 11 pages.

(Continued)

Primary Examiner — Lisa Lea Edmonds
(74) Attorney, Agent, or Firm — Brake Hughes Bellermann LLP (57) ABSTRACT According to one example embodiment, a sheet may include a first carbon fiber reinforced plastic layer, a graphite layer adjacent to the first carbon fiber reinforced plastic layer, the graphite layer comprising at least one aperture, a second carbon fiber reinforced plastic layer adjacent to the graphite layer, and at least one column of plastic extending from the first carbon reinforced plastic layer, through the at least one aperture, to the second carbon reinforced plastic layer.

20 Claims, 5 Drawing Sheets

(56) References Cited

U.S. PATENT DOCUMENTS

| | | | |
|---|---|---|---|
| 4,892,783 A | 1/1990 | Brazel | |
| 4,997,032 A | 3/1991 | Danielson et al. | |
| 5,018,328 A | 5/1991 | Cur et al. | |
| 5,107,649 A | 4/1992 | Benson et al. | |
| 5,270,092 A | 12/1993 | Griffith et al. | |
| 5,279,879 A * | 1/1994 | Takezawa | B29C 70/20 428/110 |
| 5,344,696 A * | 9/1994 | Hastings | B32B 7/02 219/529 |
| 5,362,527 A * | 11/1994 | Harpell | B32B 3/22 2/2.5 |
| 5,792,539 A | 8/1998 | Hunter | |
| 5,981,085 A | 11/1999 | Ninomiya et al. | |
| 6,037,033 A | 3/2000 | Hunter | |
| 6,055,155 A | 4/2000 | von Gutfeld | |
| 6,055,156 A | 4/2000 | von Gutfeld | |
| 6,269,864 B1 | 8/2001 | Kabadi | |
| 6,333,847 B1 * | 12/2001 | Katsui | G06F 1/203 361/625 |
| 6,358,595 B1 | 3/2002 | Kobayashi | |
| 6,418,017 B1 | 7/2002 | Patel et al. | |
| 6,450,450 B1 * | 9/2002 | MacDonald | B29C 70/24 244/126 |
| 6,801,268 B2 | 10/2004 | Huang et al. | |
| 6,809,413 B1 | 10/2004 | Peterson et al. | |
| 6,859,364 B2 * | 2/2005 | Yuasa | A01N 25/10 165/104.33 |
| 7,161,809 B2 * | 1/2007 | Ford | G06F 1/203 165/185 |
| 7,292,441 B2 * | 11/2007 | Smalc | G06F 1/203 165/185 |
| 7,349,040 B2 | 3/2008 | Lee et al. | |
| 7,545,644 B2 | 6/2009 | Fedorov | |
| 7,626,807 B2 | 12/2009 | Hsu | |
| 7,729,108 B2 | 6/2010 | Rehmann et al. | |
| 7,960,913 B2 | 6/2011 | Yee et al. | |
| 8,000,103 B2 | 8/2011 | Lipp et al. | |
| 8,092,908 B2 | 1/2012 | Ohta et al. | |
| 8,120,915 B2 | 2/2012 | Pautsch et al. | |
| 8,174,828 B2 | 5/2012 | Tilton et al. | |
| 8,227,729 B2 | 7/2012 | Sorabji et al. | |
| 8,270,914 B2 | 9/2012 | Pascolini et al. | |
| 8,350,984 B2 | 1/2013 | Perry et al. | |
| 8,568,853 B2 * | 10/2013 | Raghavendran | B32B 5/12 428/105 |
| 8,771,450 B2 * | 7/2014 | Holloway | B29C 70/386 156/180 |
| 9,104,058 B2 * | 8/2015 | Shives | G02F 1/133385 |
| 2003/0043541 A1 | 3/2003 | Yuasa et al. | |
| 2003/0157284 A1 | 8/2003 | Tanimoto et al. | |
| 2005/0100728 A1 | 5/2005 | Ristic-Lehmann et al. | |
| 2005/0270746 A1 * | 12/2005 | Reis | G06F 1/203 361/708 |
| 2007/0115635 A1 | 5/2007 | Low et al. | |
| 2007/0184238 A1 * | 8/2007 | Hockaday | B32B 7/00 428/98 |
| 2008/0112119 A1 | 5/2008 | Wang et al. | |
| 2009/0154113 A1 | 6/2009 | MacDonald | |
| 2009/0155646 A1 | 6/2009 | Endo et al. | |
| 2010/0028649 A1 | 2/2010 | Trouilhet et al. | |
| 2010/0083417 A1 | 4/2010 | Alder et al. | |
| 2010/0218932 A1 | 9/2010 | Fischer et al. | |
| 2010/0263540 A1 | 10/2010 | Hashida et al. | |
| 2011/0059275 A1 | 3/2011 | Stark | |
| 2011/0242757 A1 * | 10/2011 | Tracy | G06F 1/1616 361/679.55 |
| 2011/0247781 A1 | 10/2011 | Vafai et al. | |
| 2011/0296771 A1 | 12/2011 | Miller et al. | |
| 2012/0315482 A1 * | 12/2012 | Muramatsu | C01B 31/04 428/402 |
| 2013/0009828 A1 | 1/2013 | Pascolini et al. | |
| 2013/0037228 A1 | 2/2013 | Verschoor et al. | |
| 2013/0070399 A1 | 3/2013 | Liu et al. | |
| 2013/0093657 A1 | 4/2013 | Song et al. | |
| 2013/0189022 A1 | 7/2013 | Elliot et al. | |
| 2014/0118927 A1 | 5/2014 | Hamburgen | |
| 2015/0314556 A1 * | 11/2015 | Xie | B29C 70/30 428/113 |

FOREIGN PATENT DOCUMENTS

| | | |
|---|---|---|
| EP | 1519217 A1 | 3/2005 |
| EP | 1754993 B1 | 12/2008 |
| EP | 2154109 A1 | 2/2010 |
| WO | 03/001133 A2 | 1/2003 |
| WO | 2005/048298 A2 | 5/2005 |
| WO | 2006/033808 A2 | 3/2006 |
| WO | 2006/132695 A2 | 12/2006 |
| WO | 2010/005435 A1 | 1/2010 |
| WO | 2014062226 A1 | 4/2014 |

OTHER PUBLICATIONS

"Aerogel", Cabot, retrieved on Jan. 8, 2013 from www.cabot-corp.com/Aerogel, 3 pages.

Cabot, "Cabot Corporation's Enova® Aerogel Enables New Aerolon Thermal Insulation Coatings", Apr. 30, 2012, 3 pages.

Cabot, "Coatings", retrieved on Jan. 8, 2013 from www.cabot-corp.com/aerogel/coatings, 2 pages.

"Insulated glazing", from Wikipedia, the free encyclopedia, retrieved on Jan. 8, 2013, 7 pages.

Tnemec, "Meet the Next Generation of Thermal Insulation Coatings", retrieved on Jan. 8, 2013 from https://www.tnemec.com/news/AerolonRelease.aspx, 4 pages.

"Thermal Conductivity of Gases", Engineers Edge, retrieved on Jan. 8, 2013 from www.engineersedge.com/heat_transfer/thermal-conductivity-gases.htm, 2 pages.

Cabot Aerogel, "Thermal Wrap TW350, 600, 800", Product Features, 2011, 1 page.

Griffith et al., "Gas-Filled Panels: An Update on Applications in the Building Thermal Envelope", Proceedings of the BETEC Fall Symposium, Nov. 14, 1995, 14 pages.

Kohler, "Gas Filled Panels", Apr. 26, 2006, retrieved on Jan. 8, 2013 from gfp.lbl.gov/default.htm, 1 page.

"Pyrolytic Carbon", From Wikipedia, the free encyclopedia, retrieved on May 23, 2014, 3 pages.

"Carbon-fiber-reinforced polymer", From Wikipedia, the free encyclopedia, retrieved on May 23, 2014, 10 pages.

* cited by examiner

GRAPHITE LAYER BETWEEN CARBON LAYERS

TECHNICAL FIELD

This description relates to composite materials including carbon.

BACKGROUND

Computing devices may include a shell that encloses components of the computing device. Some of the components of the computing device may generate heat, some or all of which is transferred out of the computing device through the shell. The transfer of heat from the components may create hotspots in the shell, which are uncomfortable to a user of the computing device.

SUMMARY

According to one example embodiment, a sheet may include a first carbon fiber reinforced plastic layer, a graphite layer adjacent to the first carbon fiber reinforced plastic layer, the graphite layer comprising at least one aperture, a second carbon fiber reinforced plastic layer adjacent to the graphite layer, and at least one column of plastic extending from the first carbon reinforced plastic layer, through the at least one aperture, to the second carbon reinforced plastic layer.

According to another example embodiment, a sheet may include a carbon fiber reinforced plastic layer, an insulative layer adjacent to the carbon fiber reinforced plastic layer, and a graphite layer adjacent to the insulative layer, the insulative layer being disposed between the carbon fiber reinforced plastic layer and the graphite layer.

According to another example embodiment, a computing device may include a display, at least one input button, and a shell enclosing electronic components and surrounding the display and the at least one input button. The shell may include a first carbon fiber reinforced plastic layer, a conductive pyrolytic graphite layer adjacent to the first carbon fiber reinforced plastic layer, and a second carbon fiber reinforced plastic layer, the graphite layer being disposed between the first carbon fiber reinforced plastic layer and the second carbon fiber reinforced plastic layer.

According to another example embodiment, a computing device may include means for displaying graphical information, means for receiving input, and means for enclosing electronic components and surrounding the display and the at least one input button. The means for enclosing electronic components and surrounding the display and the at least one input button may include a first carbon fiber reinforced plastic layer, a conductive pyrolytic graphite layer adjacent to the first carbon fiber reinforced plastic layer, and a second carbon fiber reinforced plastic layer, the graphite layer being disposed between the first carbon fiber reinforced plastic layer and the second carbon fiber reinforced plastic layer.

The details of one or more implementations are set forth in the accompanying drawings and the description below. Other features will be apparent from the description and drawings, and from the claims.

DETAILED DESCRIPTION

Composite materials, such as carbon fiber reinforced plastic, may be used as shells for computing devices due to their low density and/or high strength or stiffness to density ratio. It may be desirable to maximize thermal conductivity in lateral, or x and/or y directions, to reduce hot-spot discomfort for a user caused by heat emitted by one or more processors or other components in the computing device, by dispersing the heat in the lateral directions. To increase the thermal conductivity in the lateral directions, a graphite layer may be sandwiched and/or disposed between carbon layers to form a sheet. The sheet may be used as a shell for the computing device.

Figure 1:
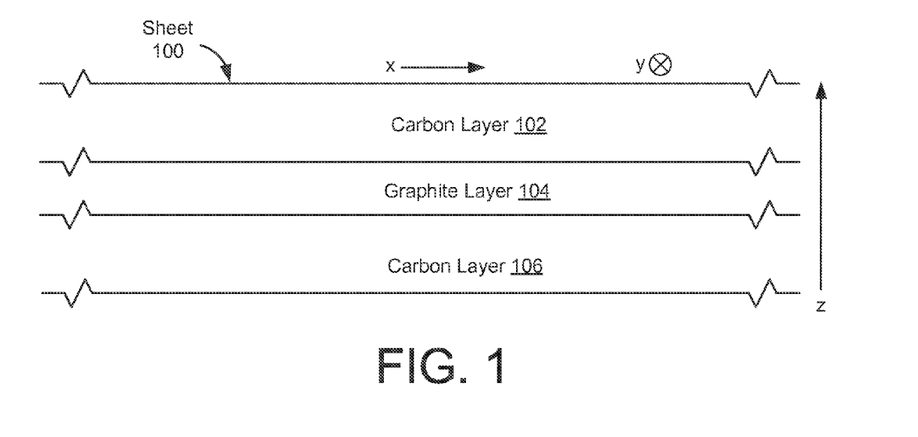
FIG. 1 is a side cross-sectional view of a sheet according to an example embodiment.

FIG. 1 is a side cross-sectional view of a sheet 100 according to an example embodiment. The sheet 100 may include a first carbon layer 102, a graphite layer 104 adjacent to the first carbon layer 102, and a second carbon layer 106 adjacent to the graphite layer 104. The graphite layer 104 may be sandwiched and/or disposed between the first carbon layer 102 and the second carbon layer 106.

The first carbon layer 102, which may be on an outside of an electronic device and face a user, may include a carbon fiber reinforced plastic layer, and/or the second carbon layer 106 may include a carbon fiber reinforced plastic layer. The graphite layer 104 may include graphite fibers and/or conductive pyrolytic graphite. In an example embodiment, the graphite layer 104 may not include any (or may exclude) plastic.

The second carbon layer 106 may be an inner layer of the sheet 100, closest to components of the electronic device. Heat may dissipate from the electronic components through the second carbon layer 106, then through the graphite layer 104, then through the first carbon layer 102, to the user.

The graphite layer 104 may increase a thermal conductivity of the sheet 100 in a lateral, or x (extending left and right on the page) and/or y (extending toward and away from the reader) direction, thereby preventing heat from dissipating from the second carbon layer 106 to the first carbon layer 102. The graphite layer 104 may thereby cause heat to be dissipated in the lateral direction rather than a z (extending up and down on the page) and/or vertical direction, reducing the heat that reaches the first carbon layer 202 and thereby reducing hotspots felt by the user.

The first carbon layer 102 may be thicker than the graphite layer 104, and/or the second carbon layer 106 may be thicker than the graphite layer 104. The first carbon layer 102 and/or the second carbon layer 106 may have a thickness that is approximately 1.6 times a thickness of the graphite layer 104. The relative thinness of the graphite layer 104 (compared with the carbon layers 102, 106) may reduce the cost of the sheet 100 due to the expense of graphite. The relative thickness of the first and second carbon layers 102, 106

(compared with the graphite layer 104) may contribute to stiffness and/or rigidity of the sheet 100. The first carbon layer 102 and/or second carbon layer 106 may, for example, be 0.16 millimeters thick and the graphite layer 104 may be 0.10 millimeters thick.

Figure 2:
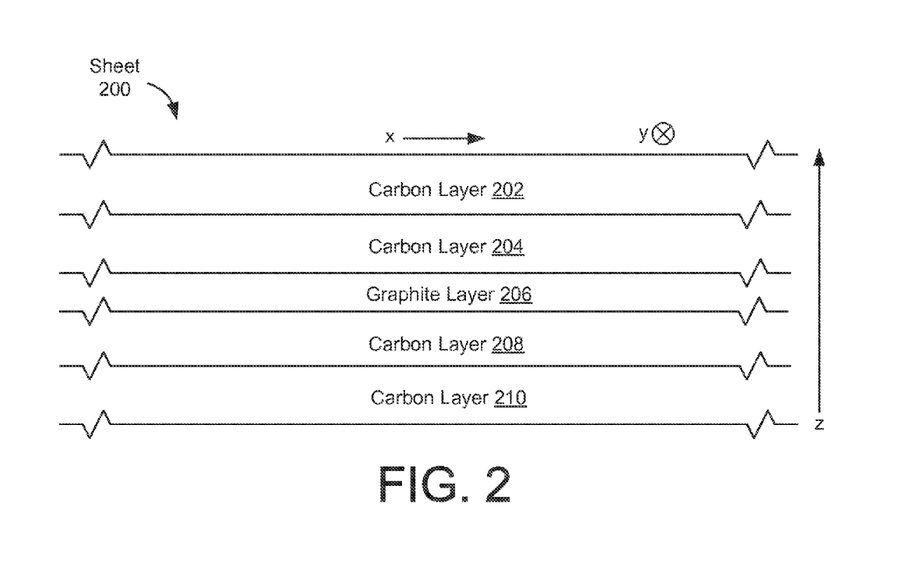
FIG. 2 is a side cross-sectional view of a sheet according to another example embodiment.

FIG. 2 is a side cross-sectional view of a sheet 200 according to another example embodiment. In this example, as in the example shown in FIG. 1, the sheet 200 may include a first carbon layer 204, a graphite layer 206 adjacent to the first carbon layer 204, and a second carbon layer 208, with the graphite layer 206 sandwiched and/or disposed between the first carbon layer 204 and the second carbon layer 208. The first carbon layer 204 may have similar features to the first carbon layer 102 described above with respect to FIG. 1, the graphite layer 206 may have similar features to the graphite layer 104 described above with respect to FIG. 1, and/or the second carbon layer 208 may have similar features to the second carbon layer 106 described above with respect to FIG. 1.

In an example embodiment, the sheet 200 may include a third carbon layer 202. The third carbon layer 202 may be adjacent to the first carbon layer 204. The third carbon layer 202 may be on an outside of an electronic device, furthest from the components, and face the user. The third carbon layer 202 may include carbon fiber reinforced plastic.

In an example embodiment, the third carbon layer 202 may have fibers extending in a first direction (such as an x-direction extending right and left across the page) that is rotated with respect to a second direction (such as a y-direction extending toward and away from the reader) that fibers in the first carbon layer 204 extend. The first direction in which the fibers of the third carbon layer 202 extend may be rotated, for example, approximately ninety degrees (90°) from, and/or be perpendicular to, the second direction in which the fibers of the first carbon layer 204 extend. The rotation of the directions in which the fibers of the first carbon layer 204 and third carbon layer 202 extend may improve the rigidity of the sheet 100 in both the x-direction and y-direction.

In an example embodiment, the sheet 200 may include a fourth carbon layer 210. The fourth carbon layer 210 may be adjacent to the second carbon layer 208. The fourth carbon layer 210 may include carbon fiber reinforced plastic.

In an example embodiment, the fourth carbon layer 210 may have fibers extending in the first direction that is rotated with respect to the second direction in which the fibers of the second carbon layer 208 extend. The direction of extension of the fibers of the fourth carbon layer 210 may be rotated, for example, approximately ninety degrees (90°) from, and/or be perpendicular to the direction of extension of the fibers of the second carbon layer 208. The directions of extension of the fibers of the second carbon layer 208 and fourth carbon layer 210 may or may not be the same as the directions of extension of the first carbon layer 204 and the third carbon layer 202. The rotation of the directions in which the fibers of the second carbon layer 208 and fourth carbon layer 210 extend with respect to each other may further improve the rigidity of the sheet 100 in both the x-direction and y-direction.

The third carbon layer 202 and/or fourth carbon layer 210 may be approximately 1.6 times as thick as the graphite layer 206. The sheet 200 may have a thickness in the z-direction of approximately 0.74 millimeters, according to an example embodiment. While four carbon layers 202, 204, 208, 210 are shown in FIG. 2, any number of carbon layers, such as one, two, three, four, five, six, seven, eight, or any other number of carbon layers may be included in the sheet 200. The sheet 200 may have a same number of carbon layers on each side of the graphite layer 206, or may have a different number of carbon layers on each side of the graphite layer 206. Adjacent carbon layers may have fibers that are parallel to each other, or may have fibers that are rotated with respect to each other, such as approximately ninety degrees (90°), or any other degree of rotation.

Figure 3:
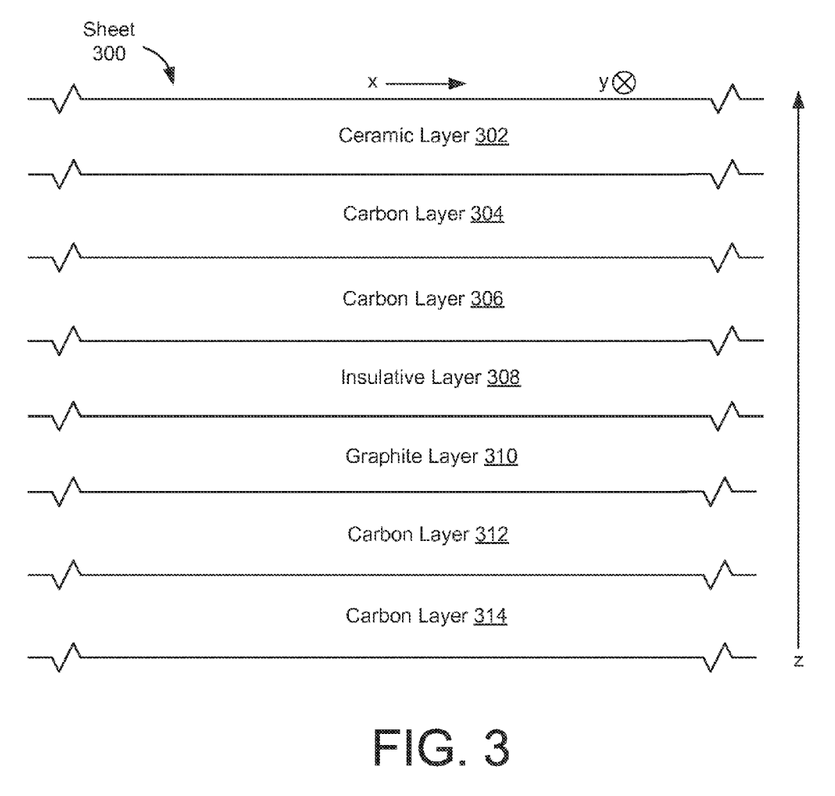
FIG. 3 is a side cross-sectional view of a sheet according to another example embodiment.

FIG. 3 is a side cross-sectional view of a sheet 300 according to another example embodiment. The sheet 300 may include a first carbon layer 306. The first carbon layer 306 may have similar properties to the first carbon layer 102 described above with respect to FIG. 1. The sheet 300 may include an insulative layer 308 adjacent to the first carbon layer 306. The insulative layer 308 may be made of a fiber mesh, such as a polymer fiber mesh, and may have a lower through-plane conductivity than graphite. The insulative layer 308 may reduce the conduction of heat in a vertical and/or z-direction, reducing hotspots experienced by a user.

The sheet 300 may also include a graphite layer 310. The graphite layer 310 may have similar properties to the graphite layer 104 described above with respect to FIG. 1. The insulative layer 308 may be sandwiched and/or disposed between the first carbon layer 306 and the graphite layer 310.

In an example embodiment, the sheet 300 may include a second carbon layer 312 adjacent to the graphite layer 310. The second carbon layer 312 may have similar properties to the second carbon layer 106 described above with respect to FIG. 1.

In an example embodiment, the sheet 300 may include a third carbon layer 304 adjacent to the first carbon layer 306, and/or a fourth carbon layer 314 adjacent to the second carbon layer 312. The third carbon layer 304 may have similar properties to the third carbon layer 202 described above with respect to FIG. 2, and/or the fourth carbon layer 314 may have similar properties to the fourth carbon layer 210 described above with respect to FIG. 2.

In an example embodiment, the sheet 300 may include a ceramic layer 302. The ceramic layer 302 may be on an outer surface of the sheet 300 when the sheet forms a shell of a computing device, and may face the user. The ceramic layer 302 may be adjacent to the third carbon layer 304, or the ceramic layer 302 may be adjacent to the fourth carbon layer 314. The ceramic layer 302 may be harder than the other layers 304, 306, 308, 310, 312, and provide a comfortable feel to the user.

The ceramic layer 302, insulative layer 308, and/or graphite layer 310 may have similar thicknesses. The first carbon layer 306, second carbon layer 312, third carbon layer 304, and/or fourth carbon layer 314 may have similar thicknesses. The thicknesses of the first carbon layer 306, second carbon layer 312, third carbon layer 304, and/or fourth carbon layer 314 may be thicker than the thicknesses of the ceramic layer 302, insulative layer 308, and/or graphite layer 310. The thicknesses of the first carbon layer 306, second carbon layer 312, third carbon layer 304, and/or fourth carbon layer 314 may, for example, be approximately 1.1 times thicker than the thicknesses of the ceramic layer 302, insulative layer 308, and/or graphite layer 310. The first carbon layer 306, second carbon layer 312, third carbon layer 304, and/or fourth carbon layer 314 may, for example, be approximately 0.11 millimeters thick, and the ceramic layer 302, insulative layer 308, and/or graphite layer 310 may be approximately 0.10 millimeters thick, for a total thickness of the sheet 300 of less than one millimeter, such as approximately 0.74 millimeters, according to an example embodiment. While four carbon layers 304, 306, 312, 314 are shown in FIG. 3, any number of carbon layers, such as one, two, three, four, five, six, seven, eight, or any other number may be included in the sheet 300. The sheet 300 may have a same number of carbon layers on each side of the graphite layer 310 and insulative layer 308, or may have a different number of carbon layers on each side of the graphite layer 310 and insulative layer 308. Adjacent carbon layers may have fibers that are parallel to each other, or may have fibers that are rotated with respect to each other, such as approximately ninety degrees (90°) from each other, or any other degree of rotation.

Figure 4A:
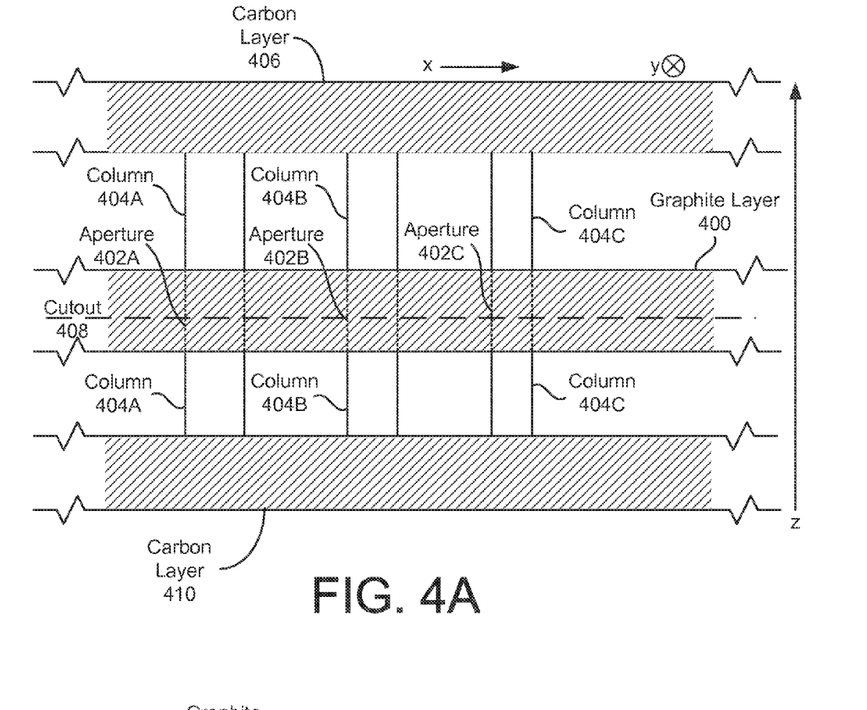
FIG. 4A is a side exploded view of a sheet according to an example embodiment.
Figure 4B:
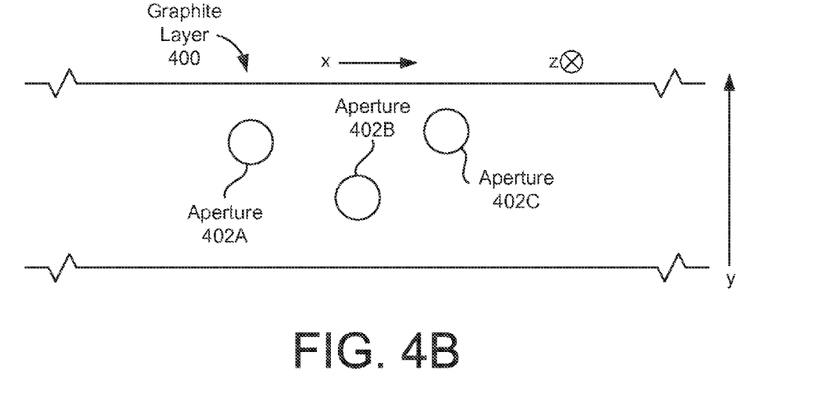
FIG. 4B is a top cutout view of the sheet shown in FIG. 4A according to an example embodiment.

FIG. 4A is a side exploded view of a sheet according to an example embodiment. As shown in FIG. 4B, columns 404A, 404B, 404C of plastic may extend from a first carbon layer 406 through apertures 402A, 402B, 402C in a graphite layer 400 to the second carbon layer 410. The columns 404A, 404B, 404C may connect the first carbon layer 406 to the second carbon layer 410. The features of the first carbon layer 406 may be included in any of the first carbon layers 102, 204, 306, and features of the second carbon layer 410 may be included in any of the second carbon layers 106, 208, 312 described above, and/or the features of any of the first carbon layers 102, 204, 306 may be included in the first carbon layer 406 and the features of any of the second carbon layers 106, 208, 312 may be included in the second carbon layer 410. While three apertures 402A, 402B, 402C and columns 404A, 404B, 404C are shown in FIG. 4A, any number of apertures and columns, such as at least one, may be included in the sheet.

FIG. 4B is a top cutout view of the sheet according to an example embodiment. The cutout is along the cutout line 408 shown in FIG. 4A. The features of the sheet described with respect to FIGS. 4A and 4B may be included in any of the sheets 100, 200, 300 described above.

In an example embodiment, a graphite layer 400, features of which may be included in any of the graphite layers 104, 206, 310 described above, may include the apertures 402A, 402B, 402C. Columns of plastic may extend from the first carbon layer 406 (shown in FIG. 4B) through the apertures 402A, 402B, 402C to the second carbon layer 410 (shown in FIG. 4B), transmitting shear from the first carbon layer 406 to the second carbon layer 410.

While the apertures 402A, 402B, 402C have been described with respect to a graphite layer, apertures may also be included in an insulative layer. In the example shown in FIG. 3, both the insulative layer 308 and graphite layer 310 may include apertures, and the sheet 300 may include columns extending from the first carbon layer 306 through the apertures of the insulative layer 308 and graphite layer 310 to the second carbon layer 312.

Figure 5:
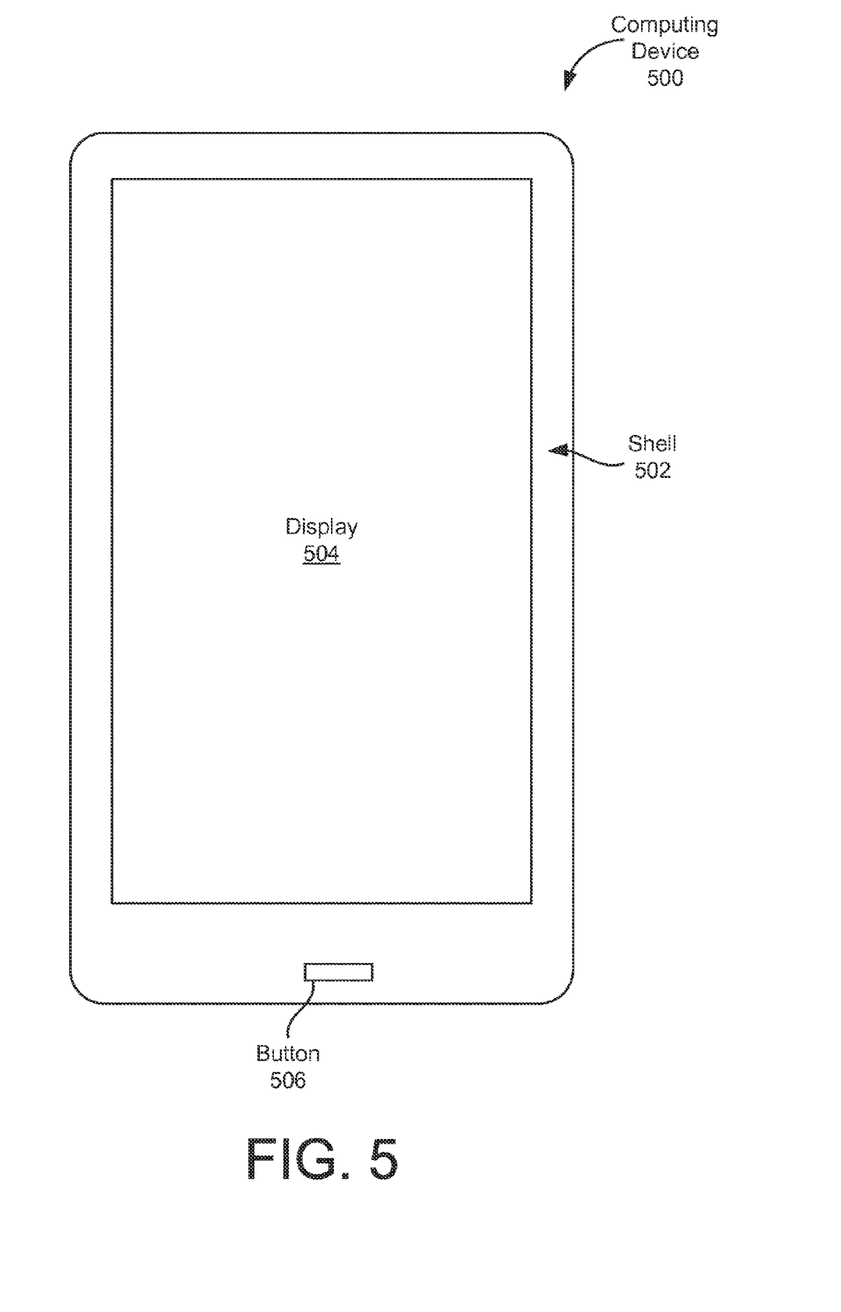
FIG. 5 is a diagram of a computing device according to an example embodiment.

FIG. 5 is a diagram of a computing device 500 according to an example embodiment. The computing device 500 may include, for example, a smartphone, a tablet computer, or a notebook or laptop computer. The computing device 500 may include a shell 502. The shell 502 may fully or partially enclose components of the computing device 500. The shell 502 may include any of the sheets 100, 200, 300 described above. The shell 502 may include any of the sheets 100, 200, 300 on all sides of the computing device 500, or may include any of the sheets on only one side, such as on a bottom side of a laptop or notebook computer. The shell 502 may include a single sheet 100, 200, 300, or may include multiple sheets 100, 200, 300 stacked on top of each other.

The computing device 500 may also include a display 504. The display 504 may be surrounded by the shell 502 (or housing). The display 504 may provide visual output to a user. In an example in which the display 504 is a touch-screen, the display 504 may also receive tactile input from a user.

The computing device 500 may also include a button 506. The button 506 may be surrounded by the shell 502. The button 506 may actuated to trigger an input from the user. While one button 506 is shown in FIG. 5, any number of buttons may be included in the computing device 500.

Figure 6:
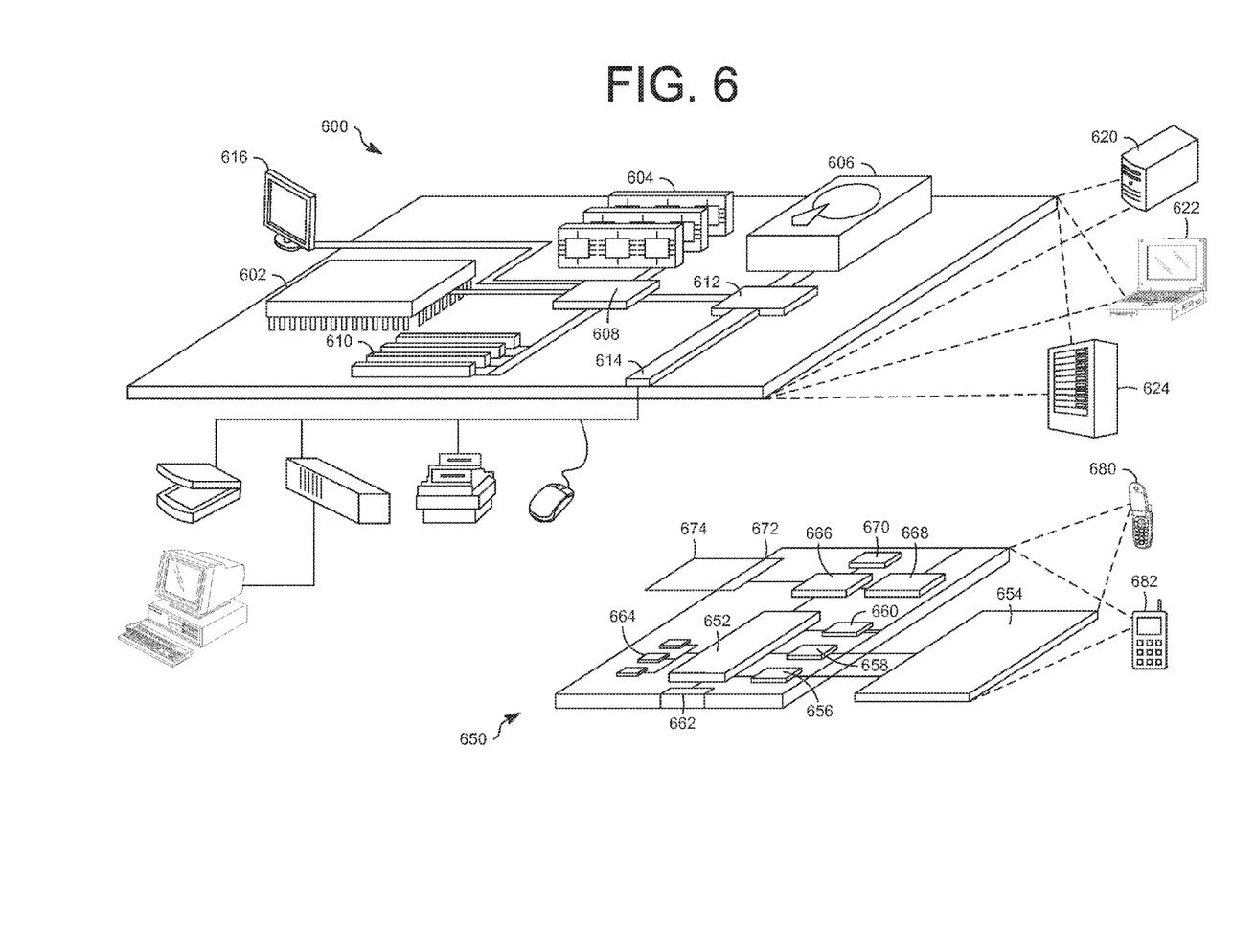
FIG. 6 shows an example of a computer device and a mobile computer device that can be used to implement the techniques described here.

FIG. 6 shows an example of a generic computer device 600 and a generic mobile computer device 650, which may be used with the techniques described here and either or both of which may include any of the features described with respect to the computing device 500. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The computing device 600 and/or computing device 650 may include a shell 502 enclosing electronic components as described above with respect to FIG. 5. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A sheet comprising:
   a first carbon fiber reinforced plastic layer;
   a graphite layer adjacent to the first carbon fiber reinforced plastic layer, the graphite layer comprising at least one aperture;
   a second carbon fiber reinforced plastic layer adjacent to the graphite layer; and
   at least one column of plastic extending from the first carbon reinforced plastic layer, through the at least one aperture, to the second carbon reinforced plastic layer.

2. The sheet of claim 1, wherein the graphite layer includes conductive pyrolytic graphite.

3. The sheet of claim 1, wherein the first carbon fiber reinforced plastic layer is thicker than the graphite layer and the second carbon reinforced plastic layer is thicker than the graphite layer.

4. The sheet of claim 1, further comprising:
   a third carbon reinforced plastic layer adjacent to the first carbon reinforced plastic layer, the third carbon reinforced plastic layer having fibers that extend in a direction that is rotated with respect to a direction that fibers of the first carbon reinforced plastic layer extend.

5. The sheet of claim 1, further comprising:
   a third carbon reinforced plastic layer adjacent to the first carbon reinforced plastic layer, the third carbon reinforced plastic layer having fibers that extend in a direction that is approximately perpendicular to a direction that fibers of the first carbon reinforced plastic layer extend.

6. The sheet of claim 5, further comprising:
   a fourth carbon reinforced plastic layer adjacent to the second carbon reinforced plastic layer, the fourth carbon reinforced plastic layer having fibers that extend in a direction that is approximately perpendicular to a direction that fibers of the second carbon reinforced plastic layer extend.

7. A sheet comprising:
   a carbon fiber reinforced plastic layer;
   an insulative layer adjacent to the carbon fiber reinforced plastic layer; and
   a graphite layer adjacent to the insulative layer, the insulative layer being disposed between the carbon fiber reinforced plastic layer and the graphite layer,
   wherein the carbon fiber reinforced plastic layer is thicker than at least one of the insulative layer and the graphite layer.

8. The sheet of claim 7, wherein the graphite layer comprises pyrolytic graphite.

9. The sheet of claim 7, wherein the carbon fiber reinforced plastic layer is thicker than the graphite layer.

10. The sheet of claim 7, wherein the carbon fiber reinforced plastic layer is thicker than the insulative layer.

11. The sheet of claim 7, wherein:
    the carbon fiber reinforced plastic layer comprises a first carbon fiber reinforced plastic layer; and
    the sheet further comprises a second carbon fiber reinforced plastic layer adjacent to the graphite layer.

12. The sheet of claim 11, wherein:
    the insulative layer comprises at least one aperture;
    the graphite layer comprises at least one aperture; and
    the sheet further comprises at least one column extending from the first carbon reinforced plastic layer, through the at least one aperture of the insulative layer and the at least one aperture of the graphite layer, to the second carbon reinforced plastic layer.

13. The sheet of claim 11, further comprising:
    a third carbon reinforced plastic layer adjacent to the first carbon reinforced plastic layer, the third carbon reinforced plastic layer having fibers that extend in a direction approximately perpendicular to a direction in which fibers of the first carbon reinforced plastic layer extend; and
    a fourth carbon reinforced plastic layer adjacent to the second carbon reinforced plastic layer, the fourth carbon reinforced plastic layer having fibers that extend in a direction approximately perpendicular to a direction in which fibers of the second carbon reinforced plastic layer extend.

14. The sheet of claim 13, further comprising a ceramic layer adjacent to the third carbon reinforced plastic layer.

15. A computing device comprising:
    a display;
    at least one input button; and
    a shell enclosing electronic components and surrounding the display and the at least one input button, the shell comprising:
       a first carbon fiber reinforced plastic layer;
       a conductive pyrolytic graphite layer adjacent to the first carbon fiber reinforced plastic layer; and
       a second carbon fiber reinforced plastic layer, the graphite layer being disposed between the first carbon fiber reinforced plastic layer and the second carbon fiber reinforced plastic layer.

16. The computing device of claim 15, wherein the first carbon fiber reinforced plastic layer is thicker than the graphite layer and the second carbon reinforced plastic layer is thicker than the graphite layer.

17. The computing device of claim 15, wherein the shell further comprises:
    a third carbon reinforced plastic layer adjacent to the first carbon reinforced plastic layer, the third carbon reinforced plastic layer having fibers that extend in a direction that is rotated with respect to a direction in which fibers of the first carbon reinforced plastic layer extend.

18. The computing device of claim 15, wherein the shell further comprises:
    a third carbon reinforced plastic layer adjacent to the first carbon reinforced plastic layer, the third carbon reinforced plastic layer having fibers that extend in a direction approximately perpendicular to a direction in which fibers of the first carbon reinforced plastic layer extend.

19. The computing device of claim 18, wherein the shell further comprises:
    a fourth carbon reinforced plastic layer adjacent to the second carbon reinforced plastic layer, the fourth carbon reinforced plastic layer having fibers that extend in a direction approximately perpendicular to a direction in which fibers of the second carbon reinforced plastic layer extend.

20. The computing device of claim 15, wherein:
    the graphite layer defines at least one aperture; and
    the shell further comprises at least one column of plastic extending from the first carbon fiber reinforced plastic layer through the at least one aperture to the second carbon fiber reinforced plastic layer.

* * * * *